US010732011B2

(12) United States Patent
Browning et al.

(10) Patent No.: US 10,732,011 B2
(45) Date of Patent: Aug. 4, 2020

(54) APPARATUS AND SYSTEM FOR BUILDING MONITORING

(71) Applicant: Intel Corporation, Santa Clara, CA (US)

(72) Inventors: David W. Browning, Beaverton, OR (US); Kevin J. Doran, North Plains, OR (US); Gabriel Cox, Hillsboro, OR (US); Jose Ignacio Parra Vilchis, Guadalajara (MX); Rafael De La Guardia González, Teuchitlan (MX); David I. Gonzalez Aguirre, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 15/821,537

(22) Filed: Nov. 22, 2017

(65) Prior Publication Data

US 2019/0049274 A1 Feb. 14, 2019

(51) Int. Cl.
*G01D 11/30* (2006.01)
*G01D 21/00* (2006.01)
*G01M 5/00* (2006.01)

(52) U.S. Cl.
CPC ............ *G01D 11/30* (2013.01); *G01D 21/00* (2013.01); *G01M 5/0075* (2013.01)

(58) Field of Classification Search
USPC ...................................................... 73/865.8
See application file for complete search history.

(56) References Cited

U.S. PATENT DOCUMENTS 6,701,772 B2 * 3/2004 Kreichauf .............. G08B 21/12
73/23.2

* cited by examiner

*Primary Examiner* — Daniel S Larkin
(74) *Attorney, Agent, or Firm* — Hanley, Flight & Zimmerman, LLC (57) ABSTRACT

Methods, apparatus, systems and articles of manufacture are disclosed herein including a monitoring system for a building including an in-wall guide for a drone, the in-wall guide extending behind at least one wall from a first location to a second location and a power delivery circuit in, or adjacent, the in-wall guide.

24 Claims, 8 Drawing Sheets

APPARATUS AND SYSTEM FOR BUILDING MONITORING

FIELD OF THE DISCLOSURE

This disclosure relates generally to monitoring, and, more particularly, to apparatus and systems for monitoring a building.

BACKGROUND

Conventional buildings (e.g., houses, office buildings, industrial buildings, etc.) monitor general environmental conditions, such as temperature and humidity via a thermostat and a humidity sensor, respectively. These general environmental conditions are used as inputs to heating, ventilation and air conditioning (HVAC) control systems. Such buildings are also often configured to monitor for off-normal conditions such as smoke or carbon monoxide and smoke detectors and carbon monoxide detectors are disposed throughout the building, consistent with building code requirements applicable to the building, to monitor the occupied spaces.

The figures are not to scale. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Building monitoring systems are typically directed to the usable space, or gross floor area, of the building measured from the inside finish of exterior walls. Once a building is built, spaces behind the walls are not monitored and no attention is generally paid to the spaces behind the walls until there is evidence of a problem noticed either from inside or outside the building. Damage mechanisms may compromise, or severely compromise, a structural integrity and/or habitability of a building without evident visual indicators in the usable space. For instance, damage due to termites or other vermin may severely compromise a structure's integrity, yet remain hidden from view behind the walls as the damage progresses. As another example, natural gas or radon, although not causing physical damage, can be hazardous or even deadly if not addressed in a timely manner.

In accord with some teachings of this disclosure, spaces between walls, studs and/or framing are monitored by an example drone operating in the spaces between walls, studs and/or framing. The example drone is to monitor at least one variable (e.g., noise, humidity level, temperature, lumens, etc.) and update a status log and/or output a deviation report to an external device.

FIGS. 1A-1D are schematic illustrations of example environments for example drones used to monitor a building in accordance with some teachings of this disclosure. FIG. 1A-1D show an example monitoring system 100 for a building including an example in-wall guide 105 for an example drone 110. In some examples, the drone 110 has a generally cylindrical shape. In some examples, the drone 110 has a diameter of about 20 mm and a length between about 100 mm-200 mm. The in-wall guide 105 extends behind an example wall 112 from an example first location P1 to an example second location P2.

In some examples, the example wall 112 includes an example frame 115 having a plurality of studs 116 (e.g., 2"×4", 2"×6", etc.) spaced apart approximately at one or more predetermined distances (e.g., about 16" on-center spacing, about 24" on-center spacing, etc.). The studs 116 are joined at the top, via mechanical fasteners (e.g., brackets, nails, screws, etc.), to an example top plate 117. The studs 116 are joined at the bottom, via mechanical fasteners, to an example bottom plate 118. Following joining of the studs 116 to the top plate 117 and the bottom plate 118 to form the frame 115, drywall 123 or another building material (e.g., oriented strand board, plaster and lath, paneling, plywood, etc.) is attached to the frame 115 via mechanical fasteners (e.g., nails, screws, etc.) to complete the wall 112 with the in-wall guide 105 and the drone 110 are disposed behind the drywall 123 (e.g., "behind the wall").

Figure 1A:
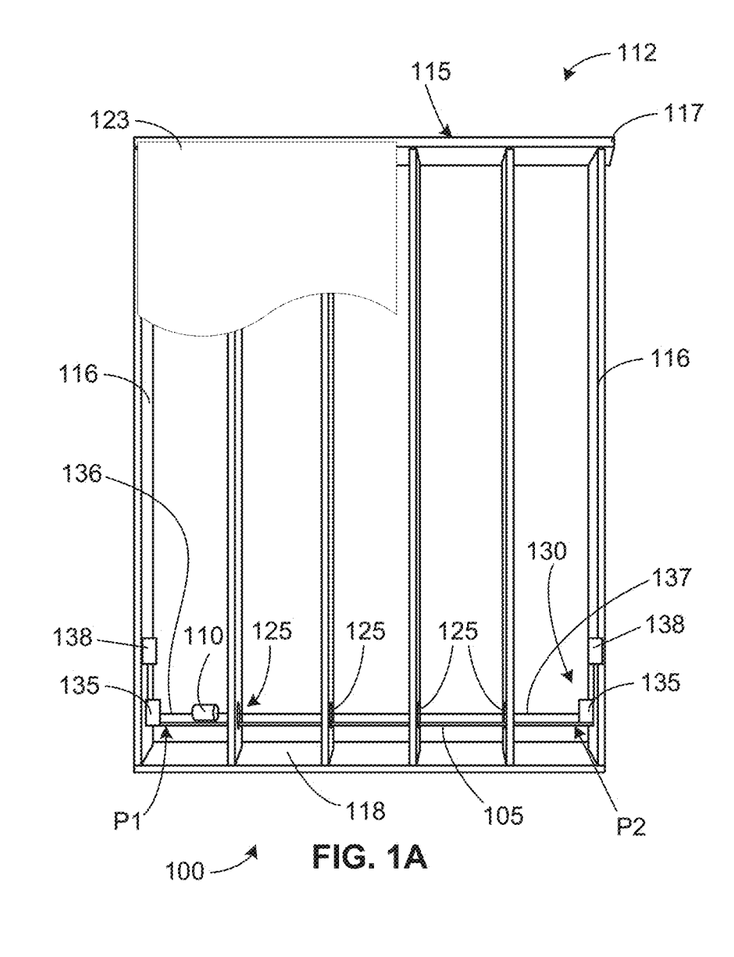
FIGS. 1A-1D are schematic illustrations of example environments for example drones used to monitor a building in accordance with some teachings of this disclosure.

As shown in FIGS. 1A-1D, example openings 125 are formed in the studs 116 to receive the in-wall guide 105 and to enable movement of the drone 110 on the in-wall guide 105 through the openings 125. The in-wall guide 105 extends behind the wall 112 from an example first location P1 to an example second location P2. In the example of FIG. 1A, the in-wall guide 105 extends from the first location P1, through openings 125 in four studs 116, to the second location P2 at a far end of the wall 112.

The drone 110 includes a drive element 130 to drive the drone 110 along the in-wall guide 105. In the example monitoring system 100 of FIG. 1A, the drive element 130 includes a first tensile element take-up reel 135 at the first location P1 and a second tensile element take-up reel 135 at the second location P2. The first tensile element take-up reel 135 has a first tensile element 136 connecting to a rear side of the drone 110. The second tensile element take-up reel 135 has a second tensile element 137 connecting a front side of the drone. In some examples the first tensile element 136 and the second tensile element 137 include a cable, such as a multi-strand or braided cable made from fibers (e.g., steel, carbon, Kevlar, nylon, etc.).

The first and second tensile element take-up reels are powered by an example power delivery circuit 138 disposed in the in-wall guide 105 or adjacent the in-wall guide 105. The power delivery circuit 138 drives the first and second tensile element take-up reels to take up the second tensile element 137 and let out the first tensile element to move the drone 110 from the first location P1 to the second location P2. The power delivery circuit 138 drives the first and second tensile element take-up reels to let out the second tensile element 137 and take up the first tensile element to move the drone 110 from the second location P2 to the first location P1. In some examples, the power delivery circuit 138 is connected to a building line voltage. For instance, in a house, the power delivery circuit 138 may be connected to a 120 VAC (volts alternating current) circuit.

Figure 1B:
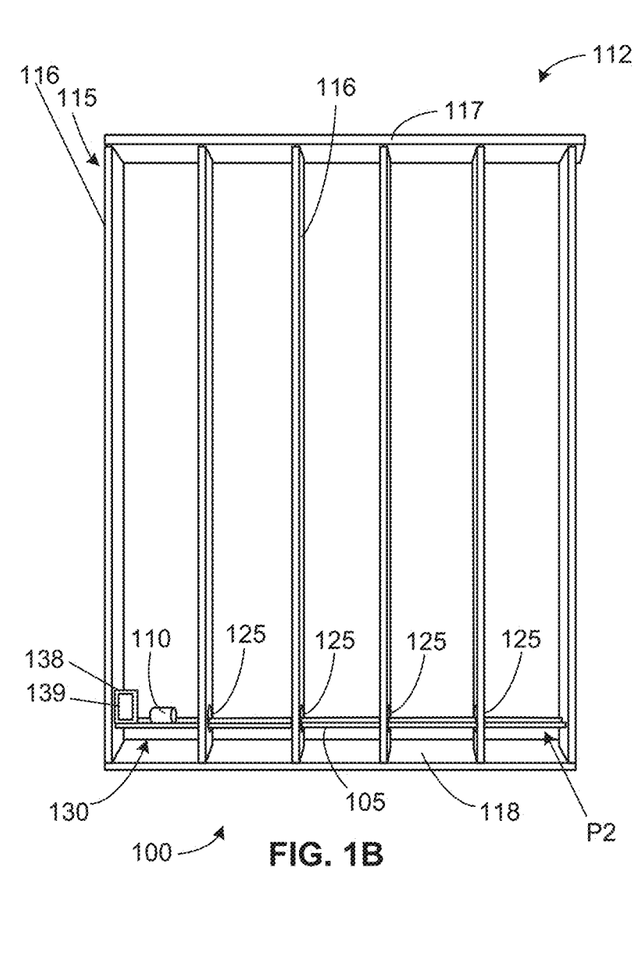

In some examples, the drive element 130 of the drone 110 of the example of FIG. 1B includes wheels, track(s) or a rack and pinion drive with the pinion having teeth to matingly engage correspondingly configured teeth on the example in-wall guide 105. In the example of FIG. 1B, the drone 110 is self-powered and includes a rechargeable battery (e.g., a single battery, a battery pack, etc.) chargeable via an example charging station 139 electrically connected to the power delivery circuit 138. When not in use, the drone 110 docks with the charging station 139 to charge the rechargeable battery.

Figure 1C:
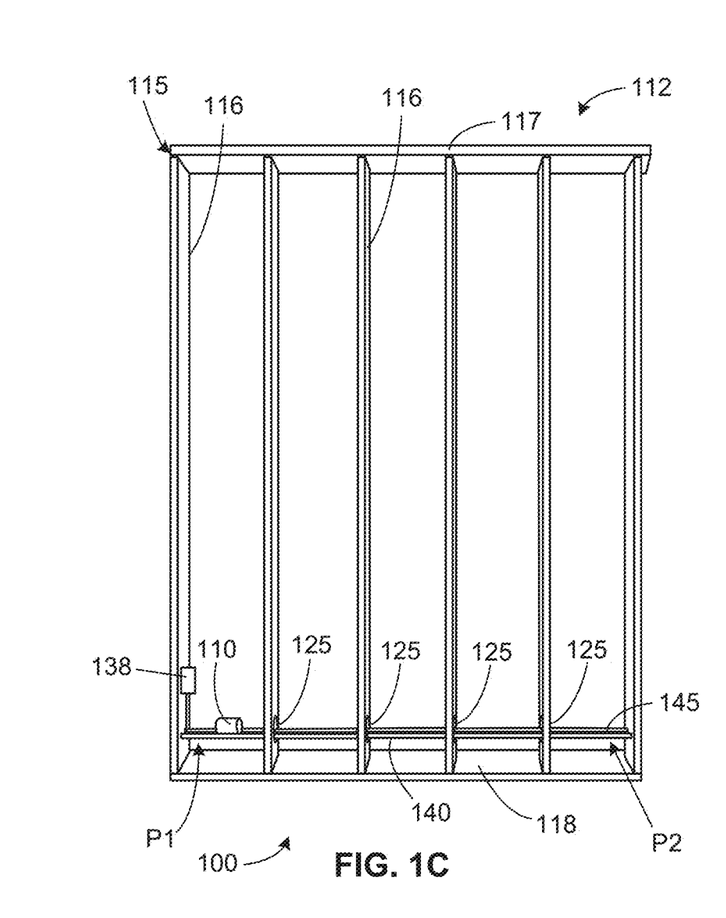

FIG. 1C shows an example wherein the in-wall guide 140 includes an example electric rail 145 and/or an example inductive surface to power to the drone 110 and/or charge a rechargeable battery of the drone 110 as the drone moves along the in-wall guide 140 and/or is stationary thereupon. The electric rail 145 and/or inductive surface is electrically connected to the power delivery circuit 138. In some examples, the drone 110 includes a contact that engages the electric rail 145 (e.g., a "third" rail). In some examples, the electric rail 145 provides an alternating current (AC) distribution, which may include a voltage regulated by a transformer. In some examples, the electric rail 145 provides a direct current (DC) distribution, and the power delivery circuit 138 includes a rectifier to covert the AC line voltage to DC. In some examples, the monitoring system 100 includes a linear actuator or a curved linear guide, with the drone 110 being affixed to a slider constructed to move along the in-wall guide 105.

Figure 1D:
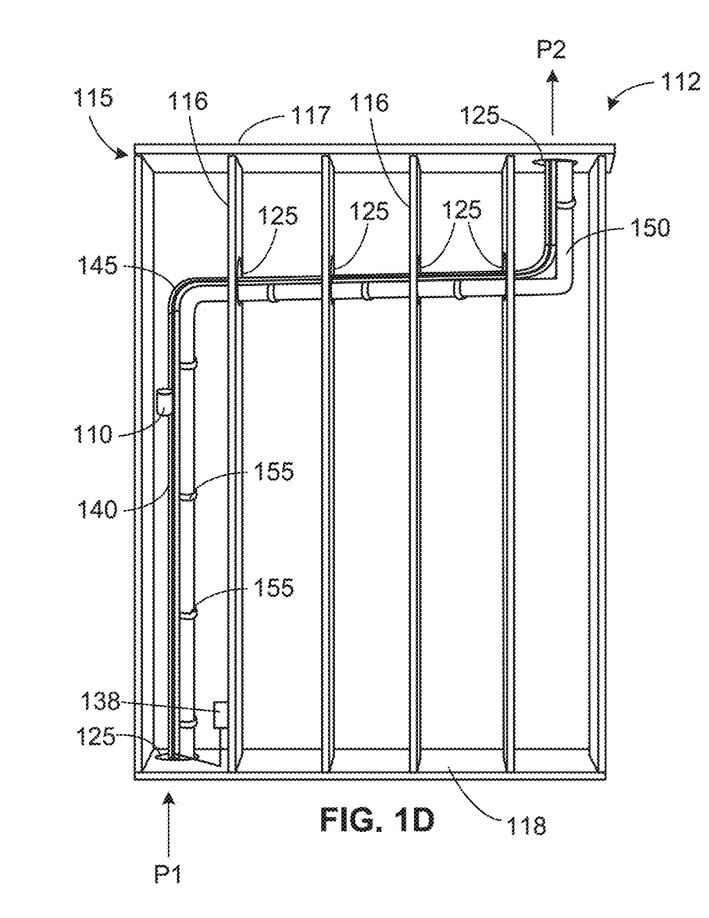

FIG. 1D shows another example, similar to that of FIG. 1C, wherein the in-wall guide 140 includes an example electric rail 145 and/or an example inductive surface to power to the drone 110 and/or charge a rechargeable battery of the drone 110 as the drone moves along the in-wall guide 140 and/or is stationary thereupon. In FIG. 1D, the in-wall guide 105 is connected to the pipe 150 via example mechanical fasteners 155 (e.g., clamps, etc.). The in-wall guide 105 extends along an example pipe 150 extending from a first location P1 at a first level of the building, through a second level of the building, to a second location P2 at a third level of the building. Within the example wall 112 of FIG. 1D, the pipe 150 and the in-wall guide 105 extend vertically through an example opening 125 in the bottom plate 118 of the wall 112, bends to extend horizontally through example openings 125 in four studs 116 and then bends to extend vertically through an example opening 125 in the top plate 117.

Figure 2:
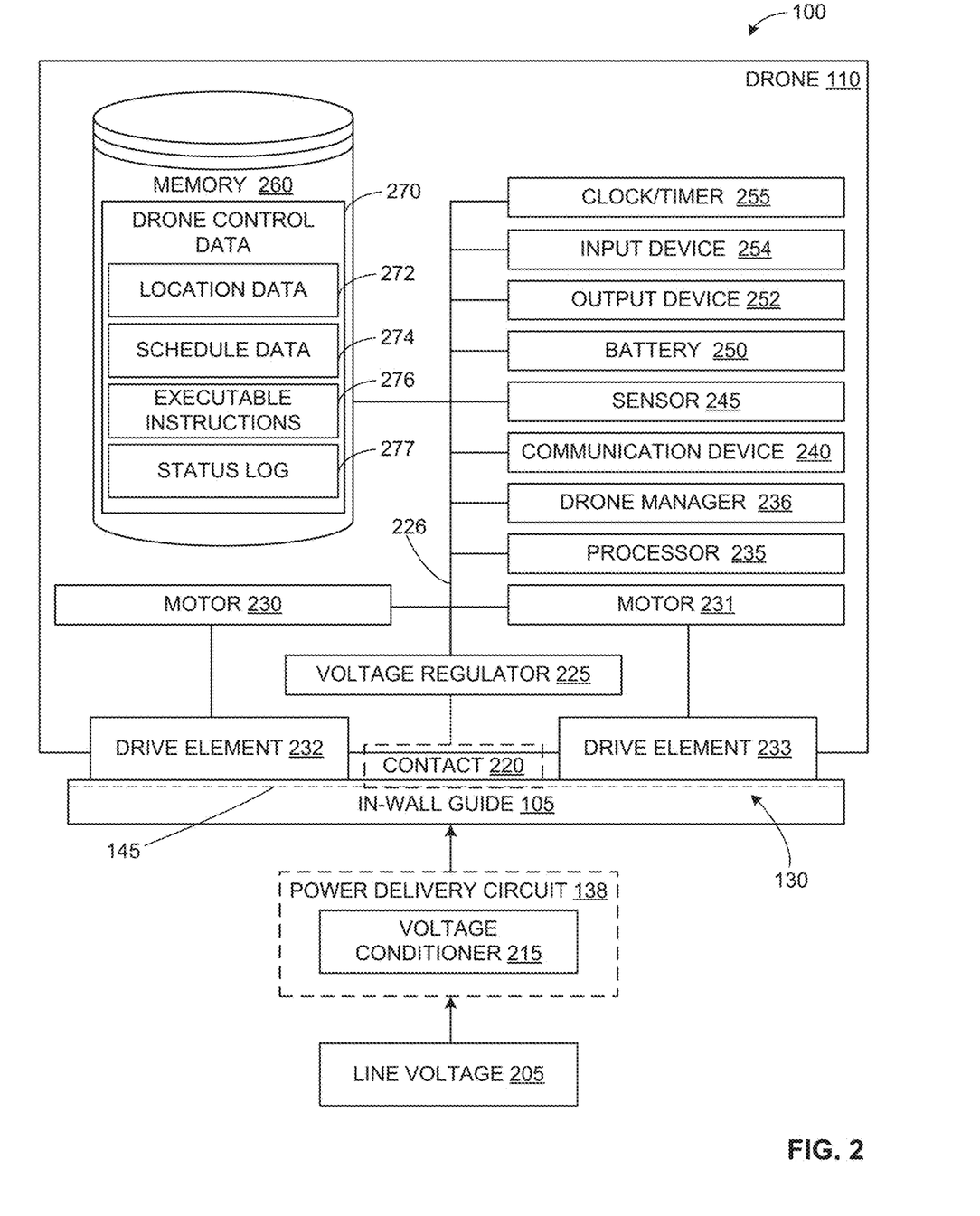
FIG. 2 is block diagram of an example drone in relation to an example guide rail in accordance with some teachings of this disclosure.

FIG. 2 is block diagram of an example drone 110 in relation to an example in-wall guide 105. FIG. 2 shows an example line voltage 205 for the building (e.g., 120/240 VAC, 120/208 VAC, etc.) electrically connected to the power delivery circuit 138, which includes an example voltage conditioner 215. The voltage conditioner 215 or line conditioner (e.g., a voltage regulator, etc.) acts to improve power quality (e.g. transient impulse protection, etc.) and deliver to the in-wall guide 105 and/or the charging station 139 a voltage having characteristics enabling proper operation of the drone 110.

The drone 110 of FIG. 2 is electrically connected to the electric rail 145 of the in-wall guide 105 via an example contact 220 extending from the drone 110 that slidingly engages the electric rail 145 of the in-wall guide 105. The power from the electric rail 145 is conditioned by an example voltage regulator 225, which may include a rectifier, and is delivered to an example bus 226. The example bus provides power to a first example motor 230 and a second example motor 231 which respectively drive a first example drive element 232 and a second example drive element 233. In some examples, the first example drive element 232 and the second example drive element 233 include wheels (e.g., wheels disposed about an axle, etc.) or continuous track drive where drive wheels or drive sprockets drive a continuous track. In some examples, the first motor 230 and the second motor 231 include brushed DC motors or brushless DC motors. In some examples, the first motor 230 and the second motor 231 include AC motors.

The drone 110 also includes an example processor 235 to process interactions with or between any of the example drone manager 236, the example communication device 240, the example sensor 245, the example batter 250, the example output device 252, the example input device 254, the example timer 255 and/or the example memory 260. The example memory 260 includes example drone control data 270 such as example location data 272, example schedule data 274, example executable instructions 276 and example status log data 277.

The drone manager 236 manages operation of the drone 110, such as to operate the first motor 230 to drive the first drive element 232 and to operate the second motor 231 to drive the second drive element 233 to move the drone 110 from a first location P1 to a second location P2, or other designated location. The drone manager 236 also manages operation of the sensor 245 to measure a physical property (e.g., a temperature, a humidity, an acoustic signature, a radon level, etc.) within the wall of the building and to use the communication device 240 to communicate the measurements of the physical property by the sensor 245, or derivatives thereof (e.g., deviation reports, etc.), to the memory 260 (e.g., to the status log 277) or to an external system (e.g., a device external to the drone).

In some examples, the communication device 240 includes a device such as a transmitter, a transceiver, a modem and/or network interface card to facilitate exchange of the measured data from the drone with one or more external machines (e.g., computing devices of any kind, computer, server, etc.). In some examples, the communication device 240 communicates wirelessly, directly or via one or more intermediary devices, to a network.

In some examples, the sensor 245 includes a camera (e.g., a charge coupled device (CCD), infrared (IR) camera, thermal camera, etc.), a radon sensor, a humidity sensor, a temperature sensor, a magnetic sensor, an acoustic sensor (e.g., one or more microphones, an ultrasonic gas detector, etc.), a thermal sensor, a spatial image sensor (e.g., an Intel® RealSense™ Depth Module D400, etc.), a carbon monoxide sensor, a gas detector (e.g., a methane detector, an ethane detector, a propane detector, etc.), a radio frequency identification (RFID) detector and/or a light sensor. In some examples, the sensor 245 includes a Phantom Analog Temperature and Humidity Sensor (TLLPN-21842196 (DHT11)) or a DHT22 AM3202 Digital Temperature and Humidity sensor, manufactured by Adafruit Industries of New York. In some examples, the sensor 245 includes an Adafruit Microphone 1063 manufactured by Adafruit Industries of New York or an Akustica AKU340 analog MEMS microphone manufactured by Akustica Inc. of Pittsburgh, Pa. In some examples, the sensor 245 includes an infrared sensor such as an SN-IR-MOD Infrared Sensor Module or a Sharp GP2Y0A21YK0F infrared (IR) sensor manufactured by Sharp Corporation of Sakai, Japan. In some examples, the sensor 245 includes a visual light camera, such as a Sony 16 MP camera or a cell phone camera module.

To illustrate one instantiation, if vermin (e.g., mice, raccoon, etc.) were to breach an exterior of the building to access the interior of the building, a location of the breach may be determined via a temperature sensor (e.g., an increased temperature gradient, etc.) or a light sensor (e.g., detecting light from outside the building, etc.) and localized via use of a camera. If the breach is detected during a routine sensor route of the drone 110 (e.g., a daily sensor route), damage due to the breach and/or the vermin may be mitigated.

In another example, in a building located in an area known to have higher levels of radon that could potential exceed a safe level of 0.4 pico-Curies per liter (pCu/L), the sensor may include a radon detector and the drone 110 scheduled to measure a radon level at one or more locations in the building at one or more times during a day and/or during a course of days (e.g., a 3-day period) since radon levels can vary over time.

In another example, in a building located in an area known to have termites or carpenter ants, the sensor 245 may include an acoustic sensor constructed to pick up the sound of snapping wood fibers (e.g., the cracking, tapping, popping or scratching noises caused by the termites or carpenter ants as they eat the wood fibers). For instance, two frequencies in the audio range (e.g., between about 5-7 kilohertz (kHz) and between about 14-16 kHz) and one frequency in the near-ultrasound range (e.g., about 20 kHz) may represent a positive indication of termite activity and the drone manager 236 may look for this acoustic signature, among other possible acoustic signatures.

In some examples, the example battery 250 includes a rechargeable battery (e.g., a lithium polymer battery, a lithium ion battery, etc.) having one or more cells.

In some examples, the output device 252 includes the communication device 240 or another communication device (e.g., a near field communication (NFC) wireless device, a wireless networking device (WiFi), a Bluetooth device, a Zigbee device, an infrared (IR) device, etc.), a haptic device, a touch screen display device, a display device, or a speaker. In some examples, the input device 254 includes the communication device 240 or another communication device (e.g., a NFC device, a WiFi device, a Bluetooth device, a Zigbee device, an IR device, etc.), a touch screen display device, a physical pushbutton or a microphone.

In some examples, the location data 272 includes a set of locations at which the drone 110 is to use the sensor 245 to measure a physical property within the wall of the building. In some examples, the location data 272 includes a current location of the drone 110 within the wall of the building, the current location being defined relative to one or more markers or reference points (e.g., a location relative to a home location, a location relative to a marker behind a specific wall 112, etc.).

In some examples, the schedule data 274 includes a schedule of operation of the drone 110. For instance, the schedule data 274 may direct the drone 110 to move to one or more locations periodically (e.g., every hour, every 4 hours, every 8 hours, every 12 hours, daily, weekly, etc.) or aperiodically (e.g., at a randomly-selected time within a bounding first time and second time) to use the sensor 245 to measure a physical property within the wall of the building at the one or more locations. In some examples, the schedule data 274 includes a user-selected value input via the input device 254 and/or the communication device 240.

In some examples, the executable instructions data 276 includes the directives to be executed by the processor 235 and/or drone manager 236 of the drone 110 to effect the periodic or aperiodic operations specified by the schedule data 274. For instance, the executable instructions 276 include a first instruction for the drone 110 to move to a first location along the in-wall guide 105 and use a first sensor 245 to measure a first physical property within the wall 112. In some examples, the executable instructions 276 cause the processor 235 and/or the drone manager 236 to analyze the measured data to determine if the measured first physical property is within an acceptable limit. In some examples, if the measured first physical property is not within an acceptable limit, the executable instructions 276 cause the processor 235 and/or the drone manager 236 to implement one or more follow-up actions (e.g., output a deviation report via the communication device 240, alter the schedule data 274 to increase a periodicity of inspection, alter a location data 272 to include additional locations for monitoring, etc.). In some examples, if the measured first physical property is within an acceptable limit, the executable instructions 276 cause the processor 235 and/or the drone manager 236 to implement one or more actions, such as to cause the drone 110 to move to a second location along the in-wall guide 105 to use the first sensor 245 to measure the first physical property within the wall 112 and to use a second sensor 245 to measure a second physical property within the wall 112, whereupon the executable instructions 276 cause the processor 235 and/or the drone manager 236 to analyze the measured data to determine if the measured first physical property and the second physical property are within acceptable limits. Examples of executable instructions 276 are shown in the example flowchart of FIG. 5.

Figure 3:
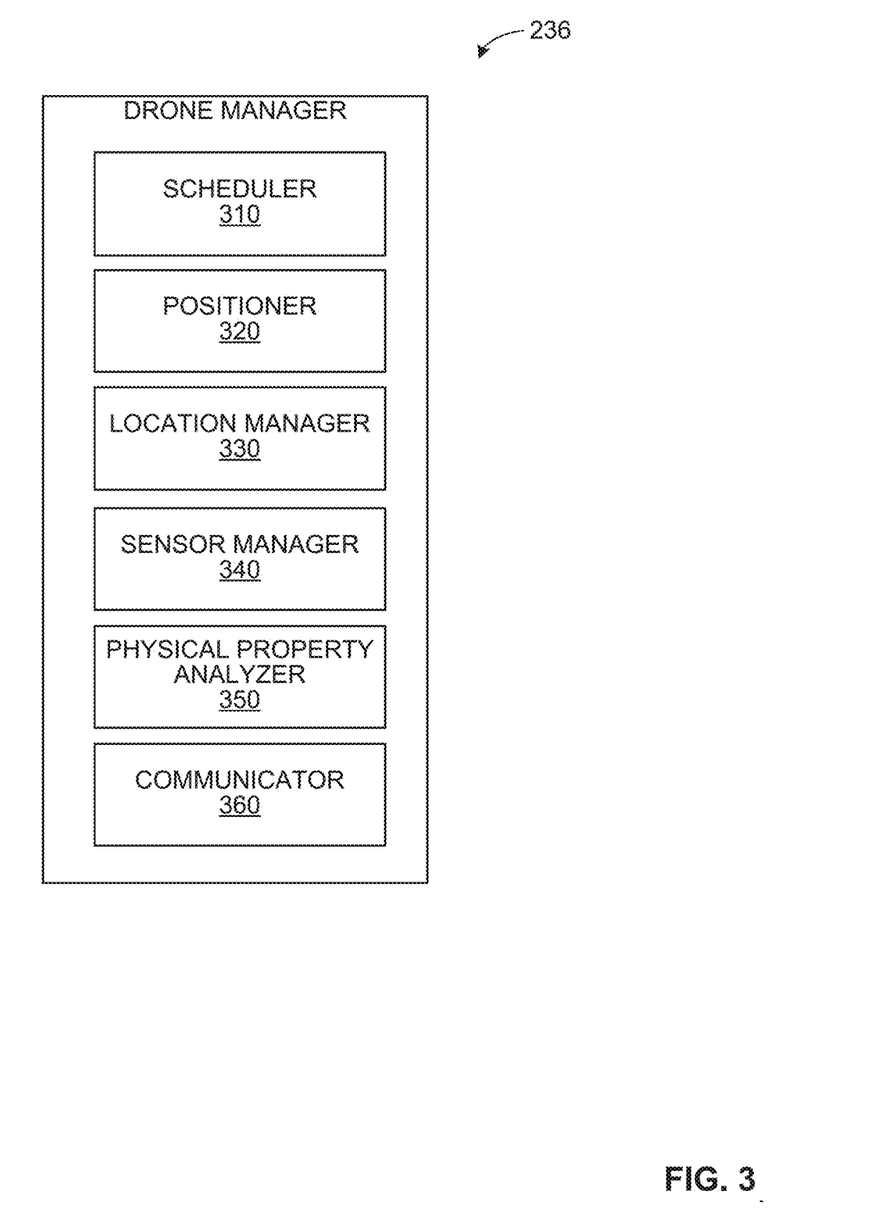
FIG. 3 is a block diagram of an example drone manager for the example drone of FIG. 2 in accordance with some teachings of this disclosure.

FIG. 3 is a block diagram of an example drone manager 236 governing operation of the example drone 110 of FIGS. 1A-2. In the example implementation of FIG. 2, the drone manager 236 includes an example scheduler 310, an example positioner 320, an example location manager 330, an example sensor manager 340, an example physical property analyzer 350 and an example communicator 360.

In some examples, the scheduler 310 is to use the schedule data 274 and the clock/timer 255 to implement operation of the drone 110 in accord with the schedule data 274 and/or to adjust the schedule data 274 responsive to inputs from the example physical property analyzer 350 or the example communicator 360.

In some examples, the positioner 320 is to control the drive element 130 of the drone 110 (e.g., the first motor 230, the second motor 231, the drive element 232 and the drive element 233 of FIG. 2) to position the drone 110 for use of the sensor 245 to measure a physical property within the wall 112. The positioner 320 cooperates with the location manager 330, which uses the location data 272 to determine a current location of the drone 110 relative to a location to which the drone 110 is to navigate to use the sensor 245 to measure a physical property within the wall 112. The location manager 330 is also to adjust the location data 272 responsive to inputs from the example physical property analyzer 350 or the example communicator 360.

In some examples, the sensor manager 340 controls operation of the sensor 245, which may include a plurality of sensors such as a camera, a radon sensor, a humidity sensor, a temperature sensor, a magnetic sensor, an acoustic sensor, a thermal sensor, a spatial image sensor, a carbon monoxide sensor, a gas detector and/or a light sensor. The sensor manager 340 is to activate the sensor 245, responsive to inputs from, for example, the scheduler 310, the location manager 330 and/or the communicator 360.

In some examples, the example physical property analyzer 350 is to compare the measured data from the sensor 245 to an acceptance criterion and/or other threshold criterion (e.g., a trigger for a shortened inspection frequency interval, etc.) for the measured physical property. If the measured data from the sensor 245 reflects a physical property that fails to satisfy an acceptance criterion and/or which fails to satisfy a threshold criterion, the physical property analyzer 350 causes the scheduler 310, the positioner 320, the location manager 330, the sensor manager 340 and/or the communicator 360 and/or, more generally, the drone manager 236 to implement one or more follow-up actions. For example, the physical property analyzer 350 may cause the drone manager 236 to output a deviation report via the communication device 240 responsive a physical property outside of an acceptance criterion. As another example, the physical property analyzer 350 may cause the drone manager 236 to alter the schedule data 274 to increase a periodicity of inspection and/or to alter the location data 272 to include additional locations for monitoring responsive a physical property outside of a threshold criterion.

In some examples, the communicator 360 manages communications between the drone manager 236 and external systems via the communication device 240.

While an example manner of implementing the drone manager 236 of FIG. 2 is illustrated in FIG. 3, one or more of the elements, processes and/or devices illustrated in FIG. 3 may be combined, divided, re-arranged, omitted, eliminated and/or implemented in any other way. Further, the example scheduler 310, the example positioner 320, the example location manager 330, the example sensor manager 340, the example physical property analyzer 350 and the example communicator 360 and/or, more generally, the example drone manager 236 of FIG. 3 may be implemented by hardware, software, firmware and/or any combination of hardware, software and/or firmware. Thus, for example, any of the example scheduler 310, the example positioner 320, the example location manager 330, the example sensor manager 340, the example physical property analyzer 350 and the example communicator 360 and/or, more generally, the example drone manager 236 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example scheduler 310, the example positioner 320, the example location manager 330, the example sensor manager 340, the example physical property analyzer 350 and/or the example communicator 360 is/are hereby expressly defined to include a non-transitory computer readable storage device or storage disk such as a memory, a digital versatile disk (DVD), a compact disk (CD), a Blu-ray disk, etc. including the software and/or firmware. Further still, the example drone manager 236 of FIGS. 2-3 may include one or more elements, processes and/or devices in addition to, or instead of, those illustrated in FIG. 3, and/or may include more than one of any or all of the illustrated elements, processes and devices.

Figure 5:
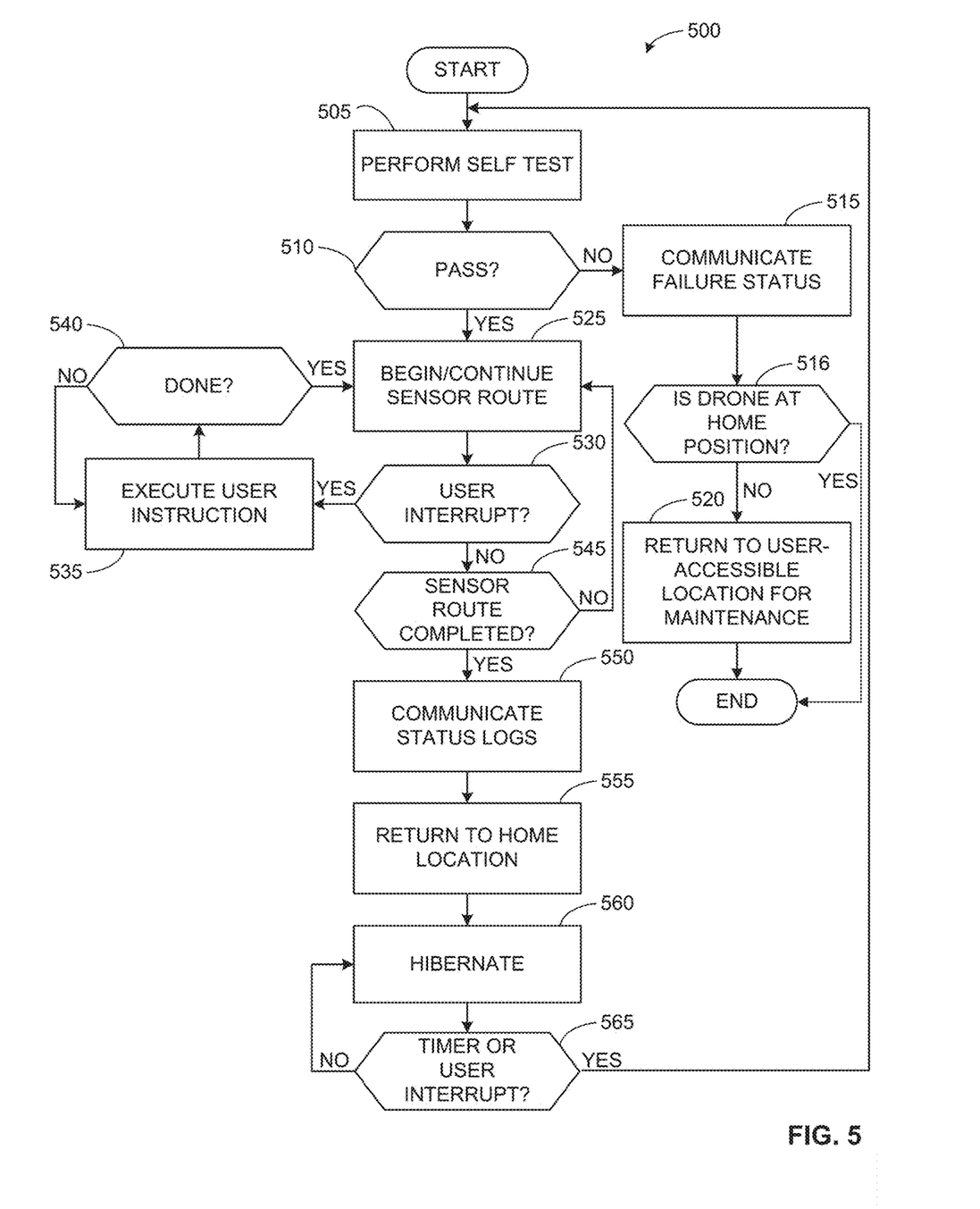
FIG. 5 presents a flowchart representation of computer-executable instructions that may be executed to implement the example drone manager 236 of FIGS. 2-3.

A flowchart representative of example machine readable instructions for implementing the drone manager 236 of FIG. 3 is shown in FIG. 5. In this example, the machine readable instructions comprise a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example drone manager 236 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example process of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 4A:
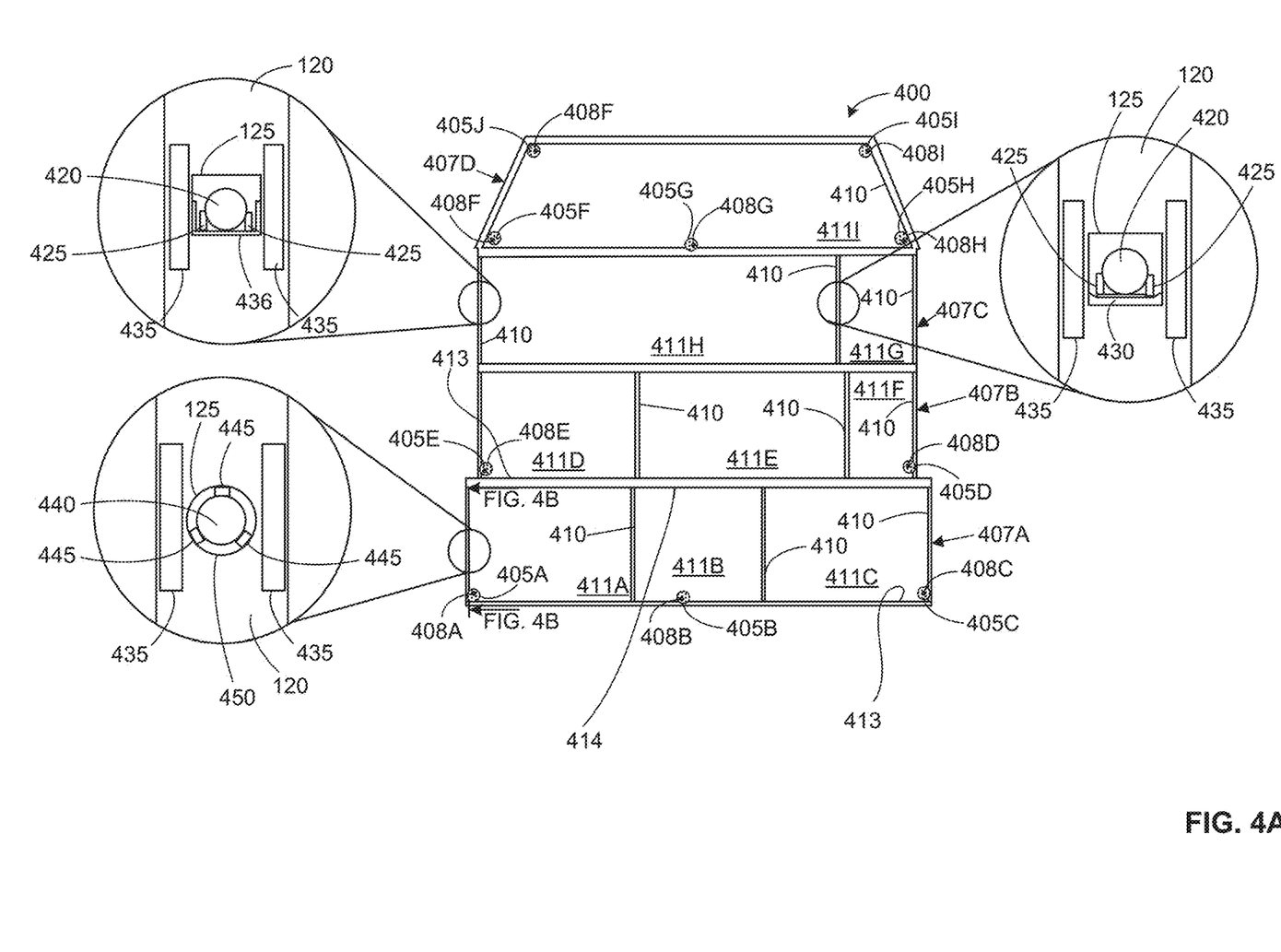
FIGS. 4A-4B are schematic illustrations of a building implementing the example monitoring system for a building in accordance with some teachings of this disclosure.
Figure 4B:
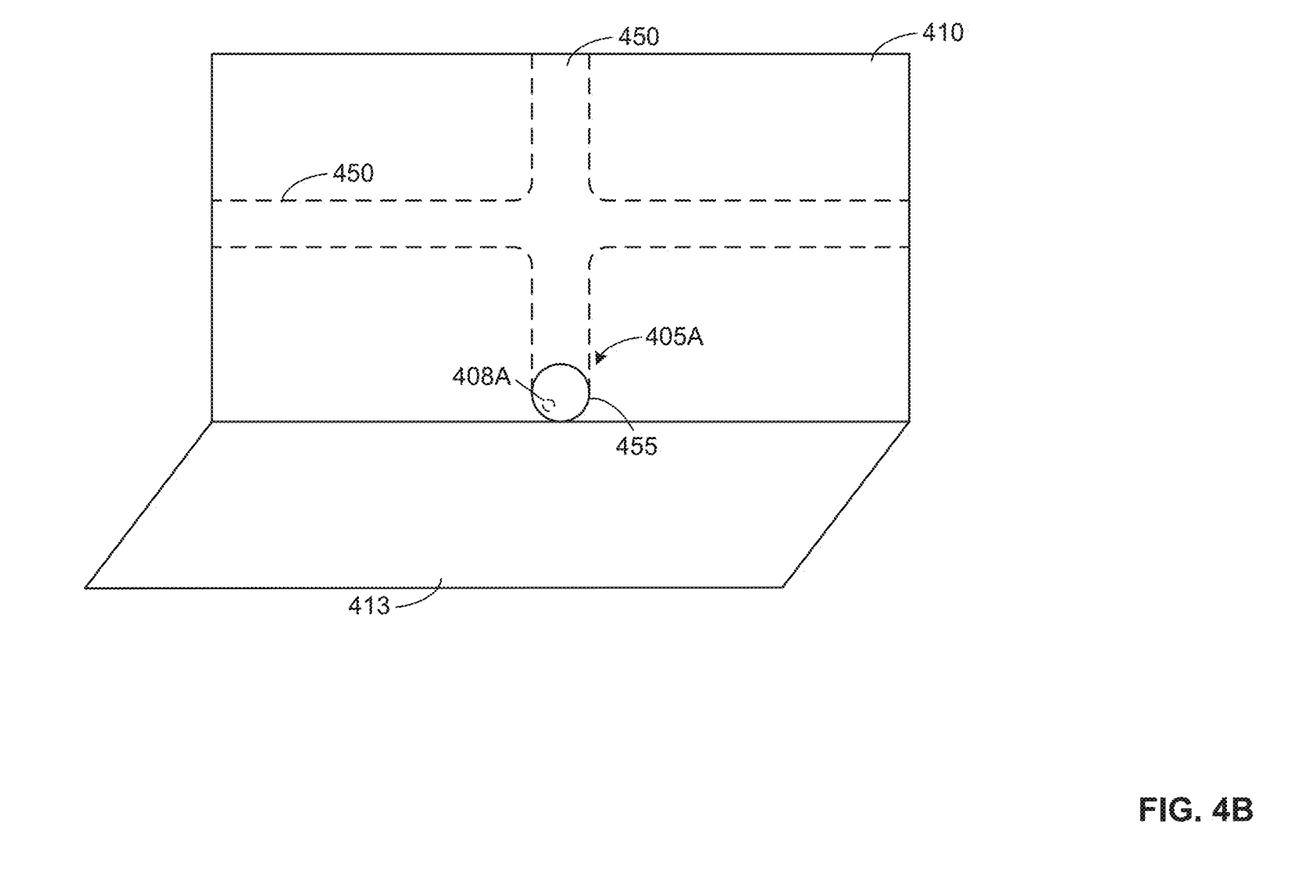

FIGS. 4A-4B are schematic illustrations of a building 400 implementing an example monitoring system, such as that shown in FIGS. 1-3. The example monitoring system includes a plurality of locations 405A-405J distributed over a plurality of levels 407A-407D of the building 400 to be inspected via the monitoring system. In some examples, each of the locations 405A-405J includes a marker 408A-408J disposed on or adjacent the in-wall guide denoting a location at which the drone is to perform a function, such as to use the sensor 245 to measure a physical property within the wall 410 of the building 400 at the location (e.g., a selected one of locations 405A-405J) in the vicinity of the respective one of the markers 408A-408J.

In some examples, the markers 408A-408J include a magnet, an RFID tag, a beacon, or an optical mark (e.g., reflector, etc.) on the in-wall guide 105 that may be sensed by a sensor 245 of the drone 110 during movement of the drone 110 on the in-wall guide 105.

Each of the plurality of levels 409A-409D of the building 400 includes one or more rooms 411A-411I defined by walls 410, floors 413 and ceilings 414 in which the example monitoring system resides and operates.

On the right side of FIG. 4A is shown an enlarged view of an example first drone 420 having example wheels 425 as drive elements positioned on an example in-wall guide 430 within an example opening 125 in an example stud 120 in the wall 410. In FIG. 4A, example reinforcement members 435 (e.g., steel plates, framing, cross-members, etc.) are affixed to the stud 120 on either side of the opening 125, such as by mechanical fasteners, to carry the additional load attributable to the illustrated geometry, which is borne by the studs in the vicinity of the opening 125.

On the upper left side of FIG. 4A is shown an enlarged view of the example first drone 420 having example wheels 425 as drive elements positioned on an example in-wall guide 436 within an example opening 125 in an example stud 120 in the wall 410. Example reinforcement members 435 are affixed via mechanical fasteners to the stud 120 on either side of the opening 125. On the lower left side of FIG. 4A is shown an enlarged view of an example second drone 440 having example tracks 445 as drive elements positioned in an example in-wall guide 450 within an example opening 125 in an example stud 120 in the wall 410. In this example, the tracks 445 are spaced apart from one another by about 120° and are biased against the inside diameter of the in-wall guide 450 to provide traction for horizontal and/or vertical movement of the second drone 440 within the in-wall guide 450. Example reinforcement members 435 are affixed via mechanical fasteners to the stud 120 on either side of the opening 125.

FIG. 4B shows an example view of a wall 410 in the example room 411A of FIG. 4A. The in-wall guide 450 is represented, via dashed lines, as a cylinder extending horizontally and vertically through the wall 410. As shown in FIG. 4A, the example second drone 440 is moving horizontally through a horizontal section of the in-wall guide 450. In some examples, to facilitate a transition from a first path (e.g., vertical movement) to a second path (e.g., horizontal movement), the example second drone 440 may include a movable actuator to bias the example second drone 440 in a desired direction. At a bottom portion of the wall 410, adjacent the example floor 413, is an example location 405A constructed to serve as a home or default location for the drone 110 (e.g., the second drone 440 of FIG. 4A). An example access panel 455 permits physical access to the drone 110. In some examples, one or more access panels 455 are provided at each level 407A-407D of the building.

In some examples, the in-wall guide (e.g., 105, 430, 436, 450) is open to the environment in an area adjacent the markers 408A-408J so as not to interfere with an ability of the drone (e.g., 420, 440) to perform a function, such as to use the sensor 245 to measure a physical property within the wall 410 of the building 400 at the location near the markers 408A-408J. For instance, a cylindrical in-wall guide 450 includes cutouts in the designated locations near the markers 408A-408J to expose the drone 440 to the in-wall environment to facilitate use of the sensor 245.

In some examples, the in-wall guides (e.g., 140, 430, 436, 450) define a plurality of routes within the building 400 along which the drone may travel. For instance, the in-wall guides 140, 430, 436, 450 may include junctions 460 (see FIG. 4B) at which the drone (e.g., 440) may transition from a first route in a first direction to a second route in a second direction. In some examples, a user may select a particular route from the available plurality of routes for the drone 110, 420, 440 to follow for a particular scheduled or unscheduled sensor route. In some examples, the drone 110, 420, 440 may itself select a route (e.g., randomly, pseudo-randomly, in accord with a schedule, via a coverage algorithm, deep learning, neural network programming, etc.) from the available plurality of routes. Accordingly, the drone 110, 420, 440 may freely move about the building, taking any available paths to reach the markers 408A-408J to complete the sensor route.

As noted above, the structure of the building 400 is itself constructed to enable movement of the drone(s) (e.g., 420, 440) through the walls 410 of the building 400, along one or more paths between one or more of the markers 408A-408J. In some examples, conventional building materials (e.g., studs) are adapted for receipt of the in-wall guide and drone (e.g., forming openings 125, displacing insulation and selecting higher R-value insulation in areas where less insulation is used, etc.). However, in some examples, the building materials may be purpose-built on-site or off-site with prefabricated channels or openings 125 and/or in-wall guides. For instance, a stud may be formed with the opening 125 and/or reinforcement members. As another example, a wall panel or structural building panel may be formed (e.g., via pultrusion, extrusion, or casting) with structural members having openings 125 to receive the in-wall guide(s) and drone(s).

The example program 500 of FIG. 5 begins at example block 505 in FIG. 5A, where the drone manager 236 performs a self-test via the processor 235 to ensure all systems are operational before departing from the home location (e.g., 405A) responsive to an input from the scheduler 310. In some examples, the drone manager 236 performs the self-test via the sensor 245 including one or more sensors to monitor one or more conditions (e.g., voltage, current, temperature, etc.) of a system or systems of the drone 110. At example block 510, the drone manager 236 determines whether the result at block 505 indicates that the drone 110 has passed the self-test. If the result at block 510 is "NO," control passes to example block 515 where the drone manager 236 communicates the failure status to an external system via the communicator 360 and/or the communication device 240 and/or the output device 252. For instance, the drone manager 236 may indicate the failure status by activating a light emitting diode (e.g., a red light) in the access panel 455 and/or by sending a wireless signal to a remote device, such as a wireless communication device within the building, via the communication device 240. Control then passes to example block 516.

At block 516, the drone manager 236 determines, via the location manager 330, if a current location of the drone 110 is the home location (e.g., at location 405A adjacent the access panel 455 (see FIG. 4A)) or a location different than the home location. If the result at block 516 is "YES," the program ends. If the result at block 516 is "NO," control passes to example block 520.

At block 520, following the determination by the drone manager 236 at block 516 that the drone 110 is not at the home location where it may be accessed, the drone manager 236 causes the drone 110 to move to the home location (e.g., adjacent the marker 408A at location 405A) via the positioner 320, which controls the drive elements 232, 233 and the location manager 330, which determines a current location of the drone via the location data 272 and/or sensor 245. Following return of the drone 110 to the home location, the program ends.

If the result at block 510 is "YES," control passes to example block 525 where the drone manager 236 either begins a sensor route specified by the scheduler 310 or continues on a sensor route already in progress, using the positioner 320, the location manager 330 and/or the sensor manager 340 to move to a location designated by the scheduler 310 to use the sensor 245 to measure a physical property within the wall 410 of the building 400 (e.g., near a marker 408A-408J). The sensor route is directed by the drone manager 236 responsive to the scheduler 310 and includes a movement of the drone 110 along the in-wall guide 105 by the drone manager 236 (e.g., using the positioner 320, the location manager 330 and/or the sensor manager 340, etc.) to perform a function using the sensor 245 (e.g., using the sensor manager 340 and the physical property analyzer 350, etc.). In some examples, the sensor route includes movement of the drone 110 along the in-wall guide 105 from a first location to a plurality of locations to perform a function using the sensor 245 (e.g., a selected sensor or sensors selected from a plurality of different sensors, etc.) at each of the plurality of locations. Following initiation or continuation of the sensor route, control passes to example block 530.

At block 530, the drone manager 236 monitors for receipt of a user interrupt signal indicative of a new instruction. If a user interrupt signal is received via the communicator 360, the result at block 530 is "YES," and control passes to example block 535. At block 535, the drone manager 236 implements the user-controlled instruction via the positioner 320, the location manager 330, the sensor manager 340, the physical property analyzer 350 and/or the communicator 360. For instance, during execution of a route and sensing activities responsive to the scheduler 310, the drone manager 236 receives a user instruction to move to a specified location and to perform one or more actions (e.g., to use a particular sensor 245 at the specified location and to output the result to a specified external system, etc.). The drone manager 236 interrupts the route and sensing activities in progress by the drone 110 and would move the drone 110 to the specified location using the positioner 320, the location manager 330 and/or the sensor manager 340 to perform the action(s) required by the user instruction using the sensor manager 340, the physical property analyzer 350 and/or the communicator 360.

During the execution of the user instruction at block 535, control passes to example block 540 where the drone manager 236 determines whether the user instruction has been completed. If the result at block 540 is "NO," control passes to block 535 where the drone manager 236 continues to implement the user-controlled instruction via the positioner 320, the location manager 330, the sensor manager 340, the physical property analyzer 350 and/or the communicator 360. If the drone manager 236 determines at block 540 that the user instruction has been completed, the result at block 540 is "YES" and control passes to block 525, where the drone manager 236 causes the drone 110 to continue on the route in progress prior to the user interrupt at block 530.

If, at block 530, the drone manager 236 determines that no user interrupt signal has been received via the communicator 360, and the result at block 530 is "NO," control passes to example block 545. At block 545, the drone manager 236 determines whether the sensor route initiated by the scheduler 310 is completed. If the drone manager 236 determines that the sensor route initiated by the scheduler 310 is not yet complete, the result at block 545 is "NO" and control passes to block 525. If the drone manager 236 determines that the sensor route initiated by the scheduler 310 is complete, the result at block 545 is "YES," and control passes to example block 550.

At block 550, the drone manager communicates status log data, or derivatives thereof (e.g., an average value for a measured property derived from three measurements taken by the sensor 245, etc.), to the memory 260, the status log 277, and/or an external device (e.g., a remote device, etc.). Control then passes to example block 555.

At block 555, the drone manager 236 causes the drone 110 to move to the home location (e.g., adjacent the marker 408A at location 405A) via the positioner 320, which controls the drive elements 232, 233 and the location manager 330, which determines a current location of the drone via the location data 272 and/or sensor 245. Control then passes to example block 560 and the drone manager 236 places the drone 110 in a hibernation mode.

Control then passes to example block 565 where the drone manager 236 awaits a signal from the scheduler 310 to initiate a sensor route and/or a user interrupt signal received via the communicator 360. If the drone manager 236 receives no signal from the scheduler 310 or the communicator 360 (i.e., the result at block 565 is "NO"), control passes back to block 560 and the drone manager 236 continues to hibernate. If the drone manager 236 receives a signal from the scheduler 310 or the communicator 360 control passes back to block 505.

Figure 6:
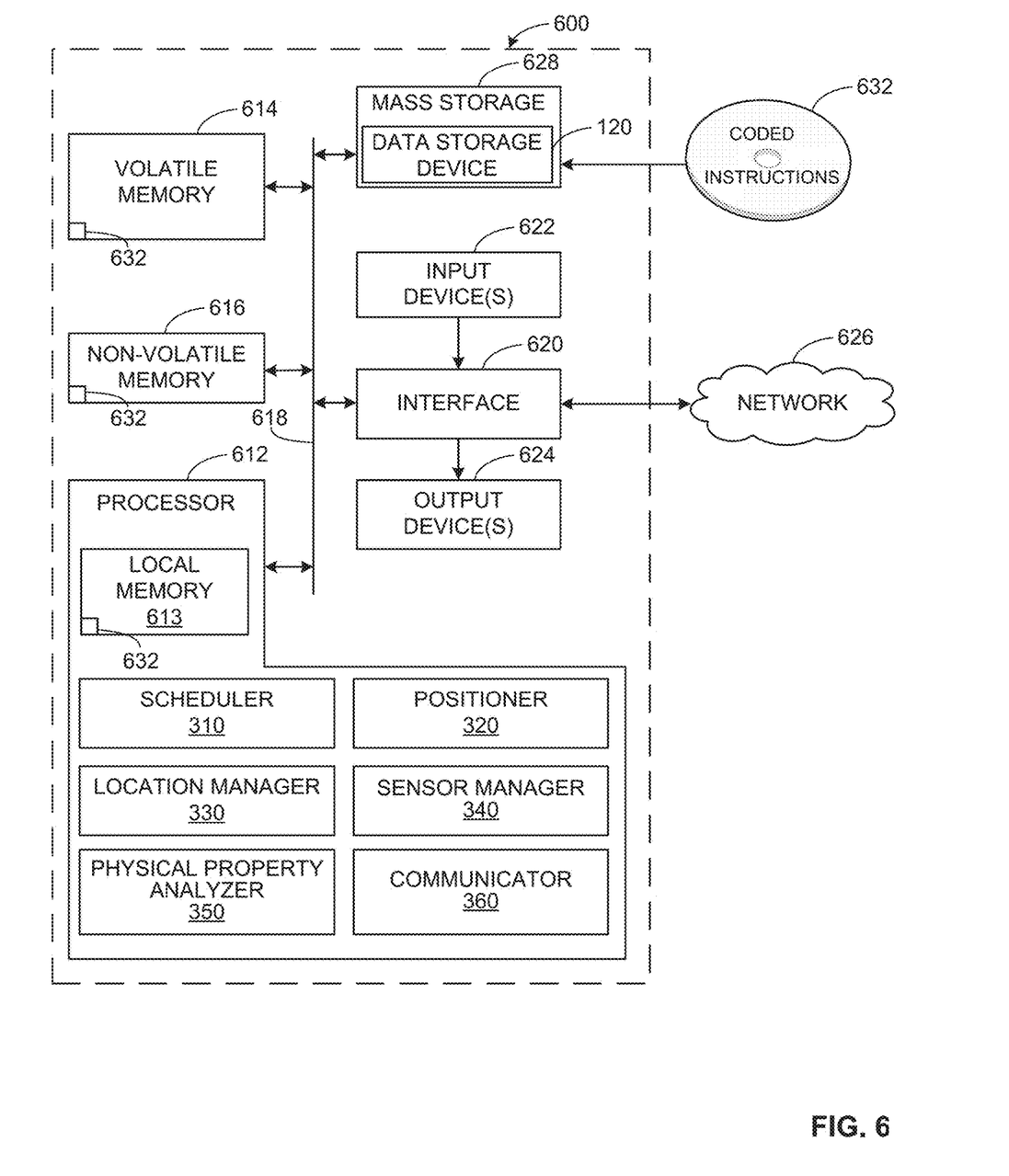
FIG. 6 is a block diagram illustrating an example processor platform which may execute the instructions of FIG. 5 to implement the example drones of FIG. 2 and FIGS. 4A-4B in the example environments of FIGS. 1A-1D and 4A-4B.

FIG. 6 is a block diagram of an example processor platform 600 capable of executing the instructions of FIG. 5 to implement the example drone manager 236 of FIGS. 2-3. The processor platform 600 can be, for example, a server, a personal computer, a mobile device (e.g., a cell phone, a smart phone, a tablet such as an iPad™), a building controller, a drone controller, a robotic device controller, a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor may be a semiconductor based (e.g., silicon based) device. In this example, the processor 612 implements the scheduler 310, the positioner 320, the location manager 330, the sensor manager 340, the physical property analyzer 350, the example communicator 360 and/or more generally the drone manager 236.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the volatile memory and non-volatile memory 614, 616, local memory and/or main memory is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a touchscreen, a tactile output device, a printer and/or speakers). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 5 may be stored in the mass storage device 628, in the volatile memory 614, in the non-volatile memory 616, and/or on a removable tangible computer readable storage medium such as a CD or DVD.

From the foregoing, it will be appreciated that example methods, apparatus and articles of manufacture have been disclosed enable early detection of a wide range of environmental and/or systemic issues that may affect buildings, enabling early intervention. The example methods, apparatus and articles of manufacture enable identification of, and mitigation of, potential hazards and damage associated therewith. Such monitoring may advantageously reduce insurance costs. Additionally, the example methods, apparatus and articles of manufacture herein are integrated into the buildings and structures in a manner that minimizes interaction between the drone(s) and occupants of the building and minimizing privacy concerns.

Example 1 is a monitoring system for a building including an in-wall guide for a drone, the in-wall guide extending behind at least one wall from a first location to a second location and a power delivery circuit in, or adjacent, the in-wall guide.

Example 2 includes the monitoring system as defined in example 1, wherein the power delivery circuit includes a charging station to provide power to charge a battery of the drone, an electric rail or an inductive surface to power to the drone.

Example 3 includes the monitoring system as defined in example 1 or example 2, wherein the electric rail is disposed in a slot formed in the in-wall guide.

Example 4 includes the monitoring system as defined in any of examples 1-3, wherein the power delivery circuit maintains the electric rail or the inductive surface at a voltage between about 5V to about 20V.

Example 5 includes the monitoring system as defined in any of examples 1-4, wherein the at least one wall includes a first wall and a second wall, the in-wall guide being disposed to extend from the first location behind the first wall to the second location behind the second wall.

Example 6 includes the monitoring system as defined in any of examples 1-5, wherein the at least one wall includes a plurality of walls of the building, the plurality of walls being located one at least one level of the building.

Example 7 includes the monitoring system as defined in any of examples 1-6, wherein the in-wall guide defines a plurality of routes within the building along which the drone may travel.

Example 8 includes the monitoring system as defined in any of examples 1-7, wherein the in-wall guide includes a ferromagnetic section extending along a length of the in-wall guide.

Example 9 includes the monitoring system as defined in any of examples 1-8, wherein the ferromagnetic section includes iron, cobalt, nickel or steel.

Example 10 includes the monitoring system as defined in any of examples 1-9, wherein the plurality of walls of the building are located on a plurality of levels of the building.

Example 11 includes the monitoring system as defined in any of examples 1-10, wherein the in-wall guide includes an angled section having an elevational change from a first height to a second height.

Example 12 includes the monitoring system as defined in any of examples 1-11, wherein the angled section includes a vertical or substantially vertical orientation.

Example 13 includes the monitoring system as defined in any of examples 1-12, wherein the angled section has a cylindrical cross-section.

Example 14 includes the monitoring system as defined in any of examples 1-13, wherein the in-wall guide extends along a perimeter of the building.

Example 15 includes the monitoring system as defined in any of examples 1-14, wherein the in-wall guide forms a closed loop.

Example 16 includes the monitoring system as defined in any of examples 1-15, wherein the in-wall guide extends through or between building materials behind the at least one wall, the building materials including at least one of a building support, a wall frame member, a stud, a beam, a floor board, a joist, a truss, webbing, noggin, masonry, insulation or batt or spaces therebetween.

Example 17 includes the monitoring system as defined in any of examples 1-16, wherein the building materials includes openings dimensioned to receive the in-wall guide and a drone conveyed thereupon or therein.

Example 18 includes the monitoring system as defined in any of examples 1-17, wherein the wall includes a pultruded, extruded or cast structural building panel.

Example 19 includes the monitoring system as defined in any of examples 1-18, further including a drone to travel along the in-wall guide from the first location to the second location.

Example 20 includes the monitoring system as defined in any of examples 1-19, wherein the drone includes a sensor to measure a physical property within the at least one wall of the building.

Example 21 includes the monitoring system as defined in any of examples 1-20, wherein the sensor includes at least one of a camera, a radon sensor, a humidity sensor, a temperature sensor, a magnetic sensor, an acoustic sensor or a light sensor.

Example 22 includes the monitoring system as defined in any of examples 1-21, wherein the drone includes at least one drive element to drive the drone along the in-wall guide.

Example 23 includes the monitoring system as defined in any of examples 1-22, wherein the at least one drive element includes a plurality of wheels.

Example 24 includes the monitoring system as defined in any of examples 1-23, wherein the at least one drive element includes a pinion having first teeth and wherein the in-wall guide includes a linear gear rack having second teeth to matingly receive the first teeth.

Example 25 includes the monitoring system as defined in any of examples 1-24, further including a first tensile element take-up reel at the first location and a second tensile element take-up reel at the second location, wherein the at least one drive element includes a first tensile element connecting a front side of the drone to the first tensile element take-up reel and a second tensile element connecting a rear side of the drone to the second tensile element take-up reel.

Example 26 includes the monitoring system as defined in any of examples 1-25, wherein the at least one drive element includes a plurality of tracks.

Example 27 includes the monitoring system as defined in any of examples 1-26, wherein the plurality of tracks are about 116° from one another about a circumference of the drone.

Example 28 includes the monitoring system as defined in any of examples 1-27, further including a drone to travel along the in-wall guide from the first location to the second location, wherein the drone includes a sensor to measure a physical property within the wall of the building and at least one drive element to drive the drone along the in-wall guide, and wherein the at least one drive element includes a plurality of magnetic wheels to magnetically adhere to the ferromagnetic section extending along the length of the in-wall guide.

Example 29 includes the monitoring system as defined in any of examples 1-28, wherein the first location is a home location located behind a wall access panel.

Example 30 includes the monitoring system as defined in any of examples 1-29, wherein the building includes a plurality of markers disposed on or adjacent the in-wall guide at a plurality of locations along the in-wall guide, each marker denoting a location at which the drone is to perform a function.

Example 31 includes the monitoring system as defined in any of examples 1-30, wherein the function is to use the sensor to measure a physical property within the wall of the building near a marker selected from the plurality of markers.

Example 32 includes the monitoring system as defined in any of examples 1-31, wherein each marker of the plurality of markers is mapped to a specific function.

Example 33 is a monitoring system for a building including an in-wall guide means for a drone, the in-wall guide means extending behind at least one wall from a first location to a second location and a power delivery means in, or adjacent, the in-wall guide means.

Example 34 includes the monitoring system as defined in example 33, wherein the power delivery means includes a charging station to provide power to charge a battery of the drone, an electric rail or an inductive surface to power to the drone.

Example 35 includes the monitoring system as defined in example 33 or example 34, wherein the power delivery means maintains the electric rail or the inductive surface at a voltage between about 5V to about 20V.

Example 36 includes the monitoring system as defined in any of examples 33-35, wherein the in-wall guide means extends through or between building materials behind the at least one wall.

Example 37 includes the monitoring system as defined in any of examples 33-36, further including a drone to travel along the in-wall guide means from the first location to the second location.

Example 38 includes the monitoring system as defined in any of examples 33-37, wherein the drone includes a sensor means to measure a physical property within the wall of the building.

Example 39 includes the monitoring system as defined in any of examples 33-38, wherein the drone includes a drive means to move the drone along the in-wall guide means.

Example 40 is a method for monitoring a building including disposing an in-wall guide behind at least one wall from a first location to a second location, the in-wall guide to convey a drone between the first location and the second location and connecting a power delivery circuit to an electric rail or inductive surface of the in-wall guide or to a charging station adjacent the in-wall guide.

Example 41 includes the method of claim 40, and further includes disposing a drone on the in-wall guide.

Example 42 includes the method of claim 40 or claim 41, and further includes moving the drone along the in-wall guide from the first location to the second location.

Example 43 includes the method of any of claims 40-42, and further includes using a sensor of the drone to measure a physical property within the wall at the first location, the second location, or at a location between the first location and the second location.

Example 44 includes the method of any of claims 40-43, wherein the first location is behind a first wall and the second location is behind a second wall.

Example 45 includes the method of any of claims 40-44, wherein the first wall and the second wall are located on the same level of the building.

Example 46 includes the method of any of claims 40-45, wherein the first wall and the second wall are located on different levels of the building.

Example 47 includes the method of any of claims 40-46, wherein the measured physical property is stored in a memory device of the drone or output to a remote device via a communication device.

Example 48 includes the method of any of claims 40-47, wherein the measured physical property is compared to an acceptance criteria for the measured physical property.

Example 49 includes the method of any of claims 40-48, wherein the measured physical property includes at least one of a radon level, a humidity level, a temperature, a magnetic field, an acoustic signature, an acoustic level, a carbon monoxide level or a lumen level Example 50 is a non-transitory machine readable medium comprising executable instructions that, when executed, cause at least one processor to at least cause a drive element of a drone to move the drone along an in-wall guide from a first location within a first wall to a second location within the first wall or within a second wall, measure a physical property within the wall using a drone sensor and compare the measured physical property to an acceptance criterion for the measured physical property Example 51 includes the non-transitory machine readable medium of claim 50, and further includes executable instructions that, when executed, cause at least one processor to at least determine if a difference between the measured physical property and the acceptance criterion for the measured physical property is less than a threshold difference.

Example 52 includes the non-transitory machine readable medium of claim 50 or claim 51, and further includes executable instructions that, when executed, cause at least one processor to at least update a status log maintained on a memory device.

Example 53 includes the non-transitory machine readable medium of any of claims 50-52, and further includes executable instructions that, when executed, cause at least one processor to at least output an error report using a communication device if the difference between the measured physical property and the acceptance criterion for the measured physical property is greater than a threshold difference.

Example 54 includes the non-transitory machine readable medium of any of claims 50-53, and further includes executable instructions that, when executed, cause at least one processor to at least accept, via a communication device, at least one of a destination location to which the drone is to navigate or a measurement to be performed at the destination location and navigate the drone from a current location to the destination location.

Example 55 includes the non-transitory machine readable medium of any of claims 50-54, and further includes executable instructions that, when executed, cause at least one processor to at least measure the physical property within the second wall at the second location using the drone sensor and compare the measured physical property to an acceptance criterion for the measured physical property at the second location.

Example 56 includes the non-transitory machine readable medium of any of claims 50-55, and further includes executable instructions that, when executed, cause at least one processor to at least cause a drive element of a drone to move the drone along an in-wall guide from a current location to the first location.

Although certain example methods, device and articles of manufacture have been disclosed herein, the scope of coverage of this patent is not limited thereto. On the contrary, this patent covers all methods, device and articles of manufacture fairly falling within the scope of the claims of this patent.

What is claimed is:

1. A monitoring system for a building, comprising:
   an in-wall guide configured for a drone, the in-wall guide extending behind at least one wall from a first location to a second location; and
   a power delivery circuit in, or adjacent, the in-wall guide, the power delivery circuit including a charging station to provide power to charge a battery of the drone, an electric rail or an inductive surface to provide power to the drone.

2. The monitoring system of claim 1, wherein the electric rail is disposed in a slot formed in the in-wall guide.

3. The monitoring system of claim 1, wherein the power delivery circuit maintains the electric rail or the inductive surface at a voltage between 5V to 20V.

4. The monitoring system of claim 1, wherein the at least one wall includes a first wall and a second wall, the in-wall guide being disposed to extend from the first location behind the first wall to the second location, the second location behind the second wall.

5. The monitoring system of claim 1, wherein the in-wall guide includes a ferromagnetic section extending along a length of the in-wall guide.

6. The monitoring system of claim 5, further including a drone, the drone to travel along the in-wall guide from the first location to the second location, wherein the drone includes a sensor to measure a physical property within the wall of the building and at least one drive element to drive the drone along the in-wall guide, and wherein the at least one drive element includes a plurality of magnetic wheels to magnetically adhere to the ferromagnetic section.

7. The monitoring system of claim 1, wherein the in-wall guide includes an angled section having an elevational change from a first height to a second height.

8. The monitoring system of claim 1, wherein the in-wall guide extends along a perimeter of the building.

9. The monitoring system of claim 1, wherein the in-wall guide forms a closed loop.

10. The monitoring system of claim 1, wherein the in-wall guide extends through or between building materials behind the at least one wall, the building materials including at least one of a building support, a wall frame member, a stud, a beam, a floor board, a joist, a truss, webbing, noggin, masonry, insulation or batt or spaces therebetween.

11. The monitoring system of claim 1, further including the drone to travel along the in-wall guide from the first location to the second location.

12. The monitoring system of claim 11, wherein the drone includes a sensor to measure a physical property within the at least one wall of the building.

13. The monitoring system of claim 12, wherein the sensor includes at least one of a camera, a radon sensor, a humidity sensor, a temperature sensor, a magnetic sensor, an acoustic sensor or a light sensor.

14. The monitoring system of claim 13, wherein the drone includes at least one drive element to drive the drone along the in-wall guide.

15. A method for monitoring a building, comprising:
    disposing an in-wall guide behind at least one wall from a first location to a second location, the in-wall guide to convey a drone between the first location and the second location; and
    connecting a power delivery circuit to an electric rail or inductive surface of the in-wall guide or to a charging station adjacent the in-wall guide.

16. The method of claim 15, including disposing the drone on the in-wall guide.

17. The method of claim 16, including moving the drone along the in-wall guide from the first location to the second location.

18. The method of claim 17, including using a sensor of the drone to measure a physical property within the wall at the first location, the second location, or at a location between the first location and the second location.

19. The method of claim 18, wherein the first location is behind a first wall and the second location is behind a second wall.

20. The method of claim 19, wherein the first wall and the second wall are located on the same level of the building.

21. The method of claim 20, wherein the first wall and the second wall are located on different levels of the building.

22. A non-transitory machine readable medium comprising executable instructions that, when executed, cause at least one processor to at least:
    cause a drive element of a drone to move the drone along an in-wall guide configured for the drone from a first location within a first wall to a second location within the first wall or within a second wall, the in-wall guide extending behind at least one wall from the first location to the second location, the in-wall guide including a power delivery circuit with a charging station to provide power to charge a battery of the drone, an electric rail or an inductive surface to provide power to the drone;

measure a physical property within the wall using a drone sensor; and compare the measured physical property to an acceptance criterion for the measured physical property.

23. The non-transitory machine readable medium of claim 22, including executable instructions that, when executed, cause the at least one processor to:

accept, via a communication device, at least one of a destination location to which the drone is to navigate or a measurement to be performed at the destination location; and navigate the drone from a current location to the destination location.

24. The non-transitory machine readable medium of claim 22, including executable instructions that, when executed, cause the at least one processor to:

measure the physical property within the second wall at the second location using the drone sensor; and compare the measured physical property to an acceptance criterion for the measured physical property at the second location.

* * * * *